2,981,724
Patented Apr. 25, 1961

2,981,724

SUSPENSION POLYMERIZATION OF VINYL CHLORIDE

Robert S. Holdsworth, Needham, Mass., assignor to Escambia Chemical Corporation, Pace, Fla., a corporation of Delaware No Drawing. Filed May 6, 1957, Ser. No. 657,007

9 Claims. (Cl. 260—92.8)

This invention relates to the production of polymers and more particularly to the production of polymers of vinyl halides.

A principal object of the present invention is to provide a process for producing polymer beads having an unusually large particle size.

Another object of the invention is to provide polymer beads of a substantially uniform particle size.

Still another object of the invention is to provide polymer beads with improved electrical resistivity.

Other objects of the invention will in part be obvious and will in part appear hereinafter.

The invention accordingly comprises the process which is exemplified in the following detailed disclosure and the scope of the application of which will be indicated in the claims.

For a fuller understanding of the nature and objects of the invention reference should be had to the following detailed description.

Heretofore, the polymer particles produced by suspension processes ranged in size from somewhat larger than those produced by emulsion processes to several hundred microns. The process of the present invention is particularly directed to the production of polymer beads which are of a generally large and uniform size having excellent electrical resistivity.

The process of the present invention comprises polymerizing a vinyl halide while dispersed in an aqueous medium containing a salt of a metal selected from the group consisting of magnesium, calcium, strontium, zinc, cadmium, barium, aluminum, lead, tin, antimony, titanium, and zirconium and at least one surface active agent selected from the group consisting of alkyl phosphates and alkali metal salts thereof, the surface active agent having from about 5 to 50 carbon atoms. The present invention is the first to describe, recognize and appreciate the fact that certain metallic salts when used in conjunction with certain surface active agents in a suspension polymerization of vinyl halides result in the production of substantially uniform, large size polymer beads which have excellent electrical resistivity.

Specific detailed methods of practicing the present invention are set forth in the following non-limiting examples. In the examples which follow, the salt of the metal having a valence of at least 2 was dissolved in the aqueous polymerization medium.

*Example I*

A mixture of 100 parts by weight of vinyl chloride, 200 parts of demineralized water, 0.2 part of lauroyl peroxide, 0.1 part of sodium di(2-ethylhexyl) phosphate and 0.1 part of barium acetate was charged to a 28 ounce glass bottle and polymerized with agitation for 16 hours at 50° C. The pH of the suspension was about 5.8. A conversion of 92 percent was obtained.

*Example II*

The polymerization described in Example I was repeated except the sodium di(2-ethylhexyl) phosphate was replaced by 0.1 part of Nacconol NRSF, an alkyl benzene sodium sulfonate. The pH of the suspension was 5.5. A conversion of 94 percent was obtained.

In each case, a resin of large, uniform particle size was obtained as shown by the following screening analyses:

|  | Example I | Example II |
|---|---|---|
| Percent Retained on 20 mesh screen | 80 | 67 |
| Percent Retained on 40 mesh screen | 18 | 32 |
| Percent Retained on 80 mesh screen | 2 | 1 |

100 parts of each resin were milled at 150° C. with 50 parts dioctyl phthalate and 10 parts of basic lead carbonate. The resin prepared using the phosphate surface active agent had a greatly improved electrical resistivity:

|  | Example I | Example II |
|---|---|---|
| Volume Resistivity (ohm-cm.) | $2.0 \times 10^{13}$ | $0.3 \times 10^{13}$ |

*Example III*

A mixture of 100 parts by weight of vinyl chloride, 200 parts of demineralized water, 0.2 part of lauroyl peroxide, 0.05 part 85 percent phosphoric acid, 0.1 part of ditallyl phosphate and 0.05 part of lead acetate was polymerized at 50° C. The pH of the suspension was about 2.5. A large, uniform particle size resin, with electrical properties such as in Example I, was obtained.

*Example IV*

A polymerization of 100 parts by weight of vinyl chloride, 200 parts of demineralized water, 0.2 part of lauroyl peroxide, 0.1 part of dibasic calcium phosphate, 0.05 part of dibasic sodium phosphate and 0.1 part of a mixed surface active agent consisting of 60 percent monolauryl phosphate, 35 percent dilauryl phosphate and 5 percent lauryl alcohol was run at 50° C. The pH of the suspension was about 3.7. A resin similar to that of Example III having a volume resistivity of $4.3 \times 10^{13}$ ohm-cm. was obtained on a compounded stock.

The present invention produces substantially uniform large size polymer beads which are chemically and physically homogeneous. This is achieved by the use of a novel stabilizing system. Although the particle size is larger than conventional, the polymer beads process easily since they readily absorb plasticizer when preblended at room temperature and yield a dry mixture. These polymer beads are dust free and handling losses are low as compared with dust-like or powder resins. The large size polymer beads present fewer fabrication problems whereas the fine powdery type present many difficulties.

The most outstanding feature of the polymer pearls produced according to the instant invention is the excellent electrical resistivity. The instant polymer beads have been found to have a much better electrical resistivity than polymer beads produced by prior processes as is illustrated in Example II.

The stabilizing system is comprised of (a) a surface active agent consisting of an alkyl phosphate or alkali metal salt thereof wherein the total number of carbon atoms contained in the alkyl group or groups is between about 5 to 50 and, (b) a salt of a polyvalent metal selected from the group consisting of magnesium, calcium, strontium, zinc, cadmium, barium, aluminum, lead, tin, antimony, titanium and zirconium. The preferred surface active agents consist of monoalkyl phosphates, dialkyl phosphates or alkali metal salts of these phosphates, which contain from about 5 to 50 carbon atoms. Example I illustrates the suitability of an alkali metal salt of a dialkyl phosphate containing 16 carbon atoms. Example III illustrates the use of a dialkyl phosphate containing 36 carbons while Example IV illustrates the use of a mixed phosphate consisting of a monoalkyl phosphate containing 12 carbon atoms and a dialkyl phosphate containing 24 carbon atoms. In place of sodium, other salts such as the potassium, ammonium, or lithium salts can be used when an alkali metal salt of an alkyl phosphate is utilized.

The amount of surface active agent used is desirably maintained between about 0.02 to about 0.20 part for every 100 parts of polymerizable compound employed. In determining the amount to be employed in any particular run, the amount of preferred metallic salt must be also considered.

In addition to the surface active agent, the polymerization stabilizing system also comprises a salt of a polyvalent metal selected from the group consisting of magnesium, calcium, strontium, zinc, cadmium, barium, aluminum, lead, tin, antimony, titanium and zirconium. Examples of suitable metallic salts are calcium acetate, calcium chloride, cadmium acetate, cadmium sulfate, barium acetate, magnesium sulfate, zinc sulfate, aluminum phosphate, titanium sulfate, zirconium sulfate and the like. Alkali metal salts such as sodium acetate resulted in agglomerated products. The combination of a preferred metal salt with a salt of an organic phosphate results in an entirely novel type of stabilizing system for vinyl compound polymerization.

The production of a resin with large, uniform particle size is obtained by a careful control of the amounts of surface active agent and polyvalent metal salt of the stabilizing system. The amount of metallic salt used is desirably maintained between about 0.02 and about 0.20 part for every 100 parts of polymerizable compound employed. The particular amounts of each component of the stabilizing system used is quite critical. Amounts of surface active agent and metallic salt below those stated result in agglomerated polymers.

Polymerization temperatures of between about 30° C. and 70° C. have been found to be most suitable. The polymerization time varies considerably depending upon such factors as the temperatures employed, catalysts, amounts of catalyst, etc. The polymerization is generally continued until substantially complete or until more than about 80 percent of the polymerizable compounds are converted to polymer. The completion of the polymerization is indicated by a pressure drop in the reactor. The reaction times are usually in excess of 12 hours when conducted at 50° C. The pressure employed can be varied. However, it must be sufficient to maintain the polymerizable compounds in the liquid phase while dispersed in the aqueous medium.

The catalyst used in the process comprises the organic peroxides. Examples of such are lauroyl peroxide, benzoyl peroxide, chlorobenzoyl peroxide, capryl peroxide, acetylbenzoyl peroxide, tertiary butyl hydroperoxide, phthalyl peroxide, succinyl peroxide and the like. Good results are obtained when between about 0.05 to about 0.50 part of peroxide is used per 100 parts of polymerizable compound. The polymerization is carried out in a liquid which is immiscible with the polymerizable compounds, i.e., the liquid medium is a non-solvent for the compound or compounds to be polymerized. Water is the preferred suspension medium. The amount of water in which the polymerization is to be effected is preferably maintained between about 1.5 to 5 times the amount of polymerizable compound used. The suspension is agitated or stirred during the polymerization. While the beads will settle out on termination of the agitation, the suspension is usually pumped as a slurry for the operation of filtration or centrifugation used to separate the polymer beads from the aqueous medium. The recovered beads can then be washed with water if desired and then dried.

The major portion of the polymer produced according to the present invention was retained on 20 mesh screens. Over 90 percent of the produced polymer was retained on screens of 40 mesh or coarser. This clearly illustrates both the large particle size of the polymer and the uniformity of the particle size. The range of particle size is quite narrow and not extended over a wide range as found in the prior art.

Since certain changes may be made in the above process without departing from the scope of the invention herein involved, it is intended that all matter contained in the above description should be interpreted as illustrative and not in a limiting sense.

What is claimed is:

1. The process of producing substantially uniform, large particle size polymer beads with improved electrical resistivity which comprises polymerizing at a temperature of between about 30° C. and 70° C. by suspension polymerization vinyl chloride while dispersed in an aqueous suspension medium containing dissolved therein a salt of a metal having a valence of at least 2 and at least one surface active agent selected from the group consisting of alkyl phosphates and alkali metal salts thereof having from about 5 to 50 carbon atoms, said metal salt and said surface active agent each being present in an amount within the range of about 0.02 to about 0.20 part per 100 parts of vinyl chloride.

2. The process of producing substantially uniform, large particle size polymer beads with improved electrical resistivity which comprises polymerizing at a temperature of between about 30° C. and 70° C. by suspension polymerization vinyl chloride while dispersed in an aqueous suspension medium containing dissolved therein a salt of a metal selected from the group consisting of magnesium, calcium, strontium, zinc, cadmium, barium, aluminum, lead, tin, antimony, titanium and zirconium, and at least one surface active agent selected from the group consisting of alkyl phosphates and alkali metal salts thereof having from about 5 to 50 carbon atoms, said metal salt and said surface active agent each being present in an amount within the range of about 0.02 to about 0.20 part per 100 parts of vinyl chloride.

3. The process of producing substantially uniform large size polyvinyl chloride beads with improved electrical resistivity which comprises polymerizing at a temperature of between about 30° C. and 70° C. by suspension polymerization vinyl chloride while dispersed in an aqueous suspension medium containing dissolved therein a salt of a metal selected from the group consisting of magnesium, calcium, strontium, zinc, cadmium, barium, aluminum, lead, tin, antimony, titanium and zirconium and a surface active agent consisting of an alkali metal salt of dioctyl phosphate, said metal salt and said surface active agent each being present in an amount within the range of about 0.02 to 0.20 part per 100 parts of vinyl chloride.

4. The process of claim 3 wherein said surface active agent is sodium di(2-ethylhexyl) phosphate.

5. The process of producing substantially uniform large size beads of polyvinyl chloride with improved electrical resistivity which comprises polymerizing at a temperature of between about 30° C. and 70° C. by suspension polymerization vinyl chloride while dispersed in an aqueous suspension medium containing dissolved therein a salt of a metal selected from the group consisting of magnesium, calcium, strontium, zinc, cadmium, barium, aluminum, lead, tin, antimony, titanium and zirconium, and a surface active agent consisting of ditallyl phosphate, said metal salt and said surface active agent each being present in an amount within the range of about 0.02 to about 0.20 part per 100 parts of vinyl chloride.

6. The process of producing substantially uniform large size polymer beads of polyvinyl chloride with improved electrical properties which comprises polymerizing at a temperature of between about 30° C. and 70° C. by suspension polymerization vinyl chloride while dispersed in an aqueous suspension medium containing dissolved therein a salt of a metal selected from the group consisting of magnesium, calcium, strontium, zinc, cadmium, barium, aluminum, lead, tin, antimony, titanium or zirconium, and a surface active agent consisting of at least one lauryl phosphate, said metal salt and said surface active agent each being present in an amount within the range of about 0.02 to about 0.20 part per 100 parts of vinyl chloride.

7. The process of claim 6 wherein said surface active agent is a mixture consisting essentially of dilauryl phosphate and monolauryl phosphate.

8. The process of producing substantially uniform, large particle size polymer beads with improved electrical resistivity which comprises polymerizing at a temperature of between about 30° C. and 70° C. by suspension polymerization vinyl chloride while dispersed in an aqueous suspension medium containing dissolved therein a salt of a metal selected from the group consisting of magnesium, calcium, strontium, zinc, cadmium, barium, aluminum, lead, tin, antimony, titanium and zirconium, and an organic phosphate as a surface active agent said metal salt and said surface active agent each being present in an amount within the range of about 0.02 to about 0.20 part per 100 parts of vinyl halide.

9. The process of producing substantially uniform large size polyvinyl chloride beads with improved electrical resistivity which comprises polymerizing at a temperature of between about 30° C. and 70° C. by suspension polymerization vinyl chloride while dispersed in an aqueous suspension medium containing dissolved therein a salt of a metal selected from the group consisting of magnesium, calcium, strontium, zinc, cadmium, barium, aluminum, lead, tin, antimony, titanium and zirconium and a surface active agent selected from the group consisting of monoalkyl phosphates, dialkyl phosphates and alkali metal salts thereof, said metal salt and said surface active agent each being present in an amount within the range of about 0.02 to 0.20 part per 100 parts of vinyl chloride.

References Cited in the file of this patent

UNITED STATES PATENTS

| | | |
|---|---|---|
| 2,365,506 | Alexander et al. | Dec. 19, 1944 |
| 2,404,791 | Coffman et al. | July 30, 1946 |
| 2,559,749 | Benning | July 10, 1951 |
| 2,674,585 | Condo et al. | Apr. 6, 1951 |
| 2,712,506 | Farris | July 5, 1955 |
| 2,713,563 | Kuhn | July 19, 1955 |